United States Patent [19]

Pate

[11] Patent Number: 5,207,016

[45] Date of Patent: May 4, 1993

[54] FISHING LURE

[76] Inventor: Wallace F. Pate, Arcadia Plantation, P.O. Drawer 458, Georgetown, S.C. 29440

[21] Appl. No.: 851,496

[22] Filed: Mar. 16, 1992

Related U.S. Application Data

[63] Continuation-in-part of Ser. No. 456,527, Dec. 26, 1989, Pat. No. 5,113,607.

[51] Int. Cl.$^5$ .............................................. A01K 85/00
[52] U.S. Cl. .................................. 43/42.28; 43/44.9; 43/42.35
[58] Field of Search ................. 43/42.36, 42.28, 42.08, 43/42.09, 42.35, 42.37, 42.38, 44.9

[56] References Cited

U.S. PATENT DOCUMENTS

| | | | |
|---|---|---|---|
| 2,172,889 | 9/1939 | Niemi | 43/42.36 |
| 2,214,668 | 9/1940 | Erickson | 43/42.08 |
| 2,712,194 | 7/1955 | Stefano | 43/44.9 |
| 2,871,046 | 1/1959 | Smith | 43/42.08 |
| 2,940,204 | 6/1960 | Mehnert | 43/42.08 |
| 3,698,119 | 10/1972 | Lewis | 43/42.08 |
| 5,090,151 | 2/1992 | Salmenez | 43/42.08 |
| 5,113,607 | 5/1992 | Pate | 43/42.36 |

Primary Examiner—Richard K. Seidel
Assistant Examiner—James Miner
Attorney, Agent, or Firm—Clifton Ted Hunt

[57] ABSTRACT

A two-piece fishing lure has a shouldered core that releasably supports one or more ring skirts which encircle the core in use and are covered by a shell that is latched to the core. The shell and the ring skirts may be quickly removed from the core and changed by disengaging the latch and pulling the shell and the ring skirts from the core. The ring skirt is molded from a flexible material to define a monolithic structure with a flexible ring portion and a plurality of filaments extending from the ring portion.

3 Claims, 3 Drawing Sheets

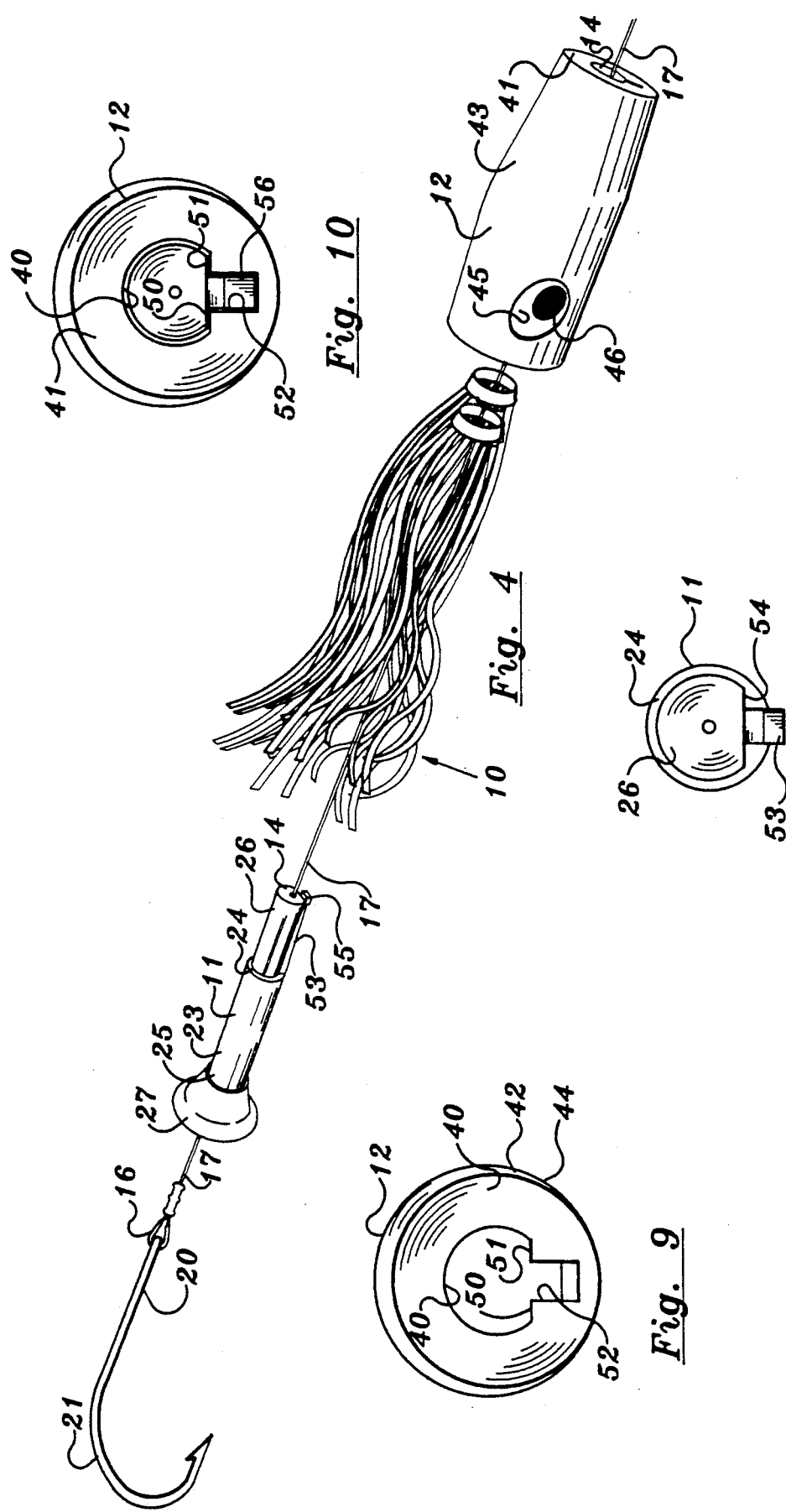

FISHING LURE

CROSS-REFERENCE TO OTHER APPLICATIONS

This application is a continuation-in-part of application Ser. No. 456,527, filed Dec. 26, 1989 for SEGMENTAL FISHING LURE AND METHOD, now U.S. Pat. No. 5,113,607.

FIELD OF THE INVENTION

This invention relates to fishing lures having interchangeable parts and of the type often used in deep sea fishing for catching billfish and other pelagic species.

BACKGROUND OF THE INVENTION

Lures used for catching billfish and other game fish often are one-piece lures with a rigid body having one or more permanently attached skirts surrounding the hook. These lures are made and used in a variety of configurations and colors and are provided with skirts of different sizes, configurations, and colors. The skirts are generally fastened to the body, as by wire, glue, tape, or otherwise.

The disadvantage of the one-piece lures is that each one is "locked in" to its shape, color, weight, size, and the length and color of its skirt. During a typical fishing day, a fisherman may change lures many times, trying to find the lure that is just right for the prevailing light, sea condition, water color, water temperature, and available natural bait. These various conditions change throughout the day, and the fisherman using one-piece lures must have many lures in his tackle drawer, each pre-rigged with a leader and hooks. The rigging and storage of a sufficient variety of lures with their leaders and hooks is troublesome.

It is known to provide lures with replaceable skirts. See, for example, U.S. Pat. No. 2,237,534 to Van Der Clute, U.S. Pat. No. 2,617,226 to Yoshi, and U.S. Pat. No. 3,740,889 to Scott.

Van Der Clute shows a lure, which may be of one-piece or two-piece construction, with a replaceable skirt having an enlarged collar resiliently clamped to the outside of the lure.

Yoshi shows a two-piece lure with a replaceable skirt that is tied to the core.

Scott shows a two-piece lure with a frusto-conical core and a clamping member that snaps over the bulbous head of the core and tightly surrounds the core. A replaceable skirt is wrapped around the core and held in place by the removable clamping member.

My prior application, Ser. No. 456,527 shows a two-piece lure with a plurality of replaceable skirts, each of which is fastened to its own ring of metal or rigid plastic material which is large enough to pass over the leader and seat against an abutment on the core, or against the ring of a preceding skirt. The abutment prevents further rearward movement of the seated skirt(s) and forward movement of the seated skirt(s) is prevented by a shell which covers the skirt(s) and is seated on the core in clamping relation to the skirt(s).

The shell and core described in my earlier application are held together by frictional engagement of the shell with an O-ring surrounding the core. The shell is removed from the core by pulling the shell from the core with enough force to overcome the frictional resistance of the O-ring pressing against the shell.

Experience has shown that the use of preformed skirt rings surrounding the core and covered by the shell is a significant improvement over the prior art wrapping and tying the skirts to a lure, but that the frictional resistance that holds the shell to the core is sometimes undesirably overcome with the lure in the water while fishing.

SUMMARY OF THE INVENTION

It is an object of this invention to retain and improve the advantages and overcome the disadvantages of the segmental fishing lure with replaceable skirts described and claimed in my said earlier patent application Ser. No. 456,527.

It is a more specific object of this invention to provide a reliable connection between the shell and the core that will prevent unintentional displacement of the shell from the core but can be activated to quickly release the shell from the core when desired. A mechanical latch provides the reliable connection between the core and the shell in the illustrated embodiment of the invention.

Another object of the invention is to provide an improved skirt wherein a skirt ring and the filaments of the skirt are molded together as a monolithic structure to form a novel ring skirt. The rigid skirt ring described in my application Ser. No. 456,527 is replaced by an enthickened portion of the same soft and flexible plastic from which the filaments are formed.

The new ring skirt with its flexible ring has the economic advantage of being made in one piece and the functional advantage of enabling the skirt to be positioned snugly about the core and being easier to handle. The advantages of easily assembling the skirt on the core and covering it with the shell are retained, while overcoming the disadvantages of the time and expense required to attach the filaments to the ring.

BRIEF DESCRIPTION OF THE DRAWINGS

FIG. 4 is an exploded perspective view of the fishing lure and ring skirts shown in FIG. 1;

FIG. 9 is an end view looking at the rear of the shell;

FIG. 10 is an end view looking at the front of the shell; and

FIG. 11 is an end view looking at the front of the core.

DETAILED DESCRIPTION OF THE INVENTION

Figure 1:
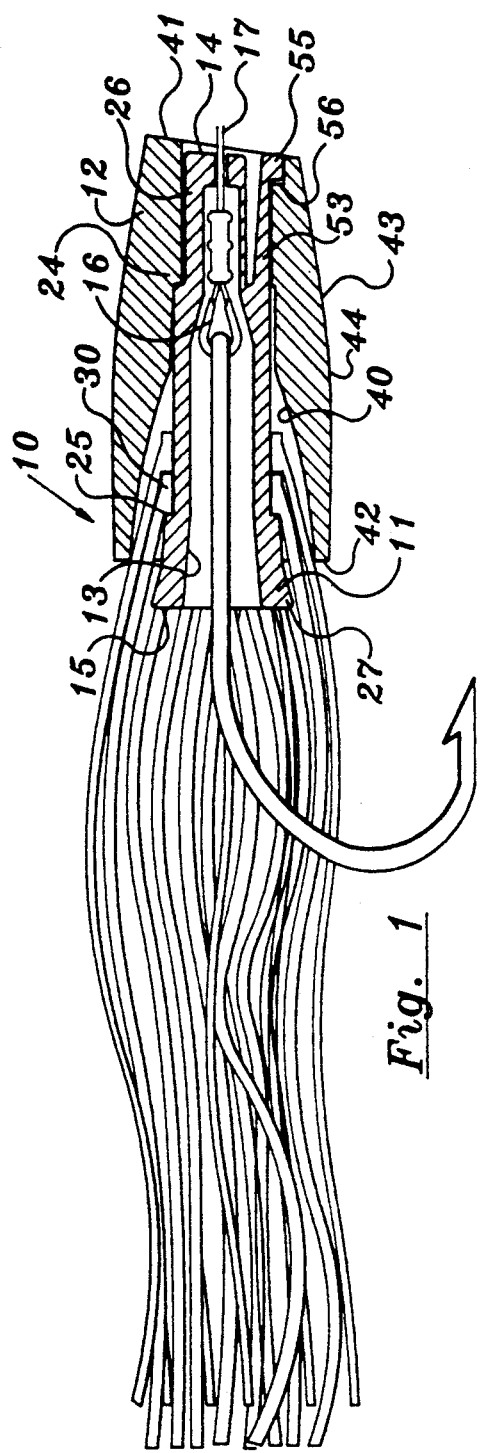
FIG. 1 is a longitudinal sectional view of the fishing lure assembled for use with two ring skirts.
Figure 2:
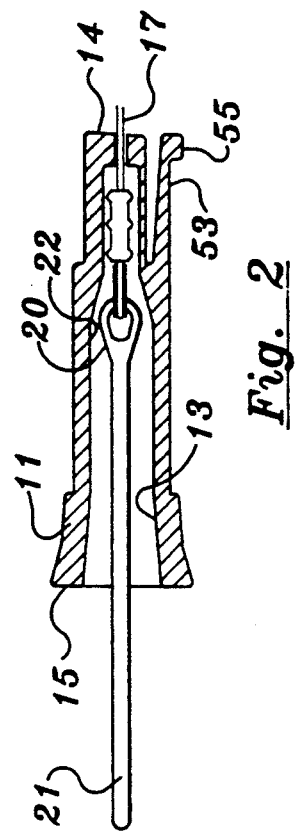
FIG. 2 is a longitudinal sectional view of the core rotated ninety degrees from the position shown in FIG. 1.

Referring more specifically to the drawings, the two-piece fishing lure, broadly indicated at 10, comprises a core 11, a shell 12, and one or more ring skirts.

The core 11 is of elongated tubular construction having a passageway 13 extending through the core and communicating with the front 14 and rear 15 of the core. The passageway 13 is of small diameter as it extends rearwardly from the front wall 14 of the core and enlarges to a larger diameter to receive the bight and thimble 16 of a leader 17 fastened to the shank 20 of a hook 21. The passageway 13 is shaped at 22 to snugly receive the shank 20 to prevent the hook from rotating relative to the core and to hold the hook in a selected position while fishing.

As shown in FIG. 4, the core 11 has a medial portion 23 of uniform diameter between a forward annular abutment 24 and an annular shoulder 25 at the rear of the medial portion 23. The core extends forwardly in a reduced portion 26 from the shoulder 25 to the front wall 14 of the core. The annular abutment 24 separates the medial portion 23 from an enlarged terminal portion 27, which tapers outwardly and rearwardly from the shoulder 25.

Figure 6:
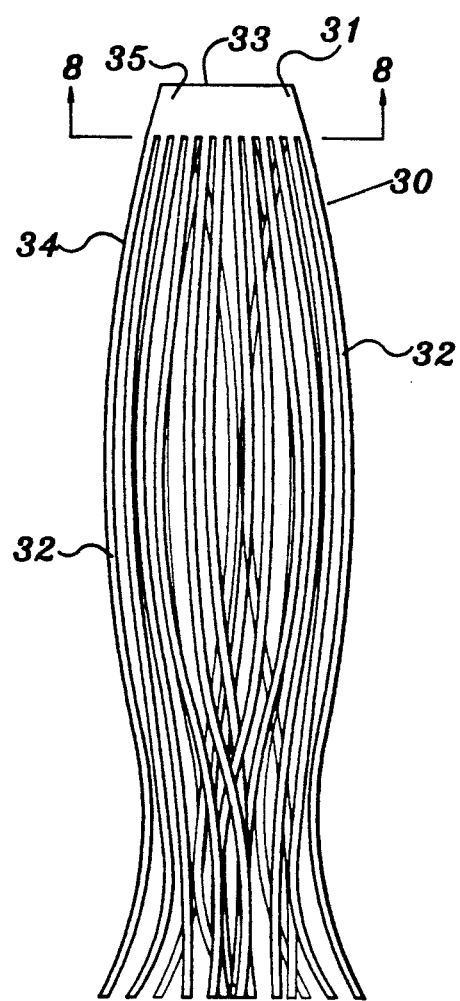
FIG. 6 is a front view of one of the ring skirts removed from the fishing lure.

The annular shoulder 25 provides a seat for a ring skirt 30 mounted in encircling relation on the medial portion 23 of the core 11. The skirt 30 is molded from a suitable flexible plastic and comprises a ring portion 31 and a plurality of filaments 32 formed integrally with the ring portion as a monolithic structure. As seen in FIG. 6, the ring 31 has a top or front wall 33 and an outer wall 35 which tapers outwardly and rearwardly from the front wall 33 to the juncture of the ring portion 31 with the filaments 32. The filaments 32 are formed with their outer edges 34 flush with the outer wall 35 of the ring, but the inner wall 36 of the ring portion 31 extends radially inwardly beyond the filaments 32 to define an annular ledge 37.

Figure 3:
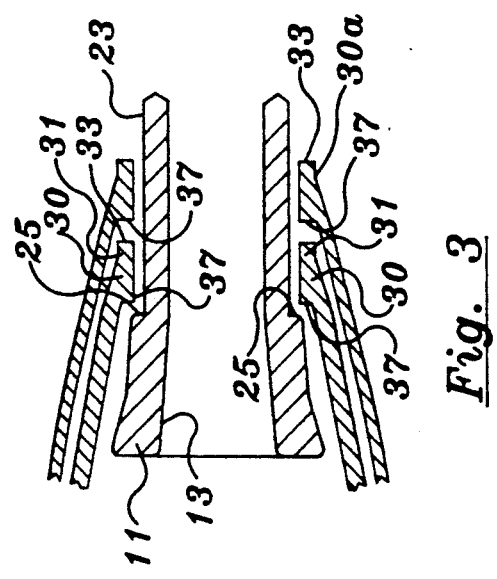
FIG. 3 is an enlarged fragmentary sectional view, with parts broken away, illustrating the conforming structure of the ring skirts with the core and with each other.
Figure 5:
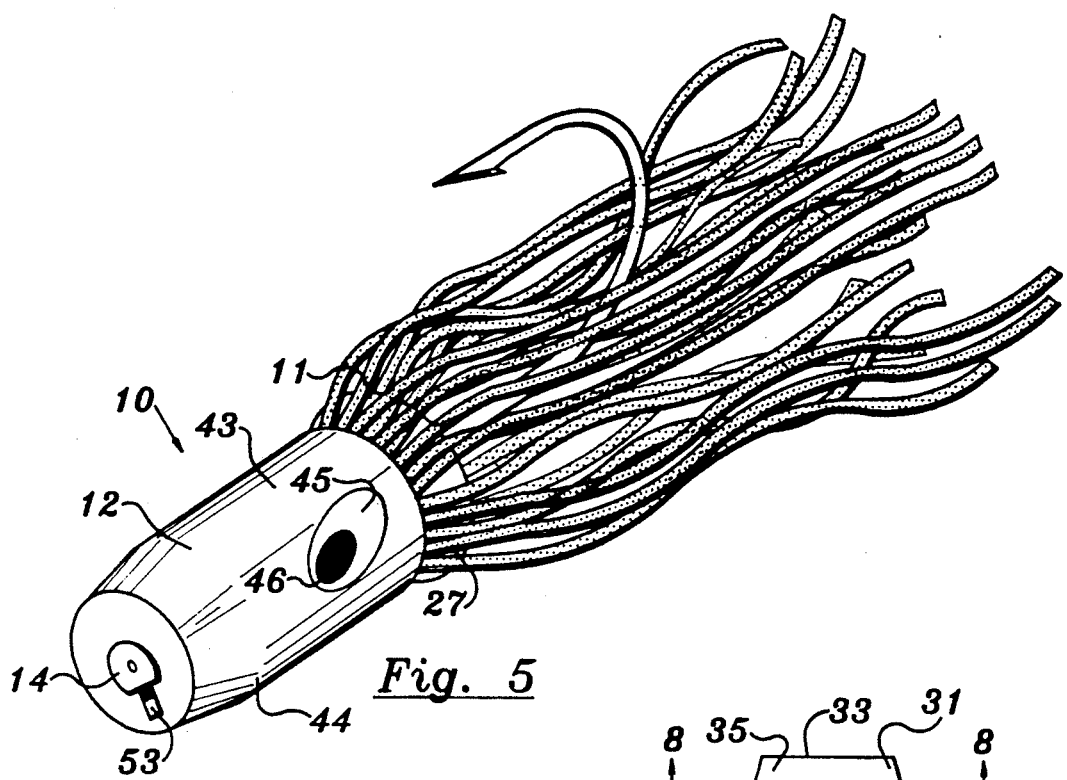
FIG. 5 is a perspective view looking at the front and top of the fishing lure and ring skirts.
Figure 7:
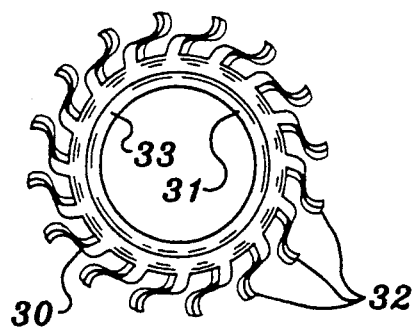
FIG. 7 is a top view of the ring skirt shown in FIG. 6.
Figure 8:
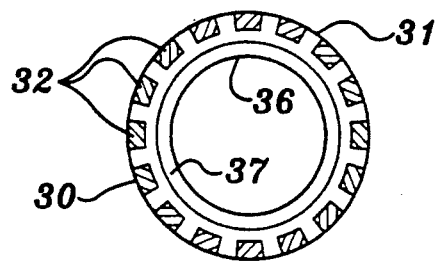
FIG. 8 is a sectional view taken along the line 8—8 in FIG. 6.

The ledge 37 on a first skirt 30 mounted on the medial portion 23 of the core 11 seats against the annular shoulder 25 and the ledge 37 on a successive skirt 30A seats against the front 33 of the first skirt 30 (FIG. 3).

The shell 12 is formed from plastic or other semi-rigid molding material in a tubular configuration with a passageway 40 extending therethrough and communicating with the front wall 41 and with the rear wall 42 of the shell. In the illustrated embodiment, the front wall 41 tapers downwardly and rearwardly at a desired water displacement angle but may have other configurations and shapes as desired. The outer wall 43 of the shell is shown to taper upwardly and rearwardly from the front wall to a point 44 about midway of the length of the shell. The rear portion of the outer wall 43 is of substantially uniform diameter. The outer wall may have opposed recesses 45 in its rear portion to receive decals 46 simulating the eyes of a fish.

The passageway 40 is sufficiently large through the rear portion of the shell to receive the medial portion 23 of the core 11 and a pair of ring skirts 30, as shown in FIG. 1. Referring to FIGS. 9 and 10, it is seen that the passageway 40 tapers inwardly toward the front 41 of the shell. Opposed shoulders 50 and 51 define a rectangular channel 52 between them which communicates with the front wall 41.

The rectangular channel 52 receives a movable latch 53 extending forwardly from the medial portion 23 of the core in spaced parallel relation to the forward portion 26 and tensioned to move toward and away from the forward portion of the core. The lower surface of the forward portion 26 of the core 11 is flattened as at 54 in FIG. 11 to conform with the rectangular shoulders 50, 51 formed in the passageway 40 of the shell (FIGS. 9 and 10).

The latch 53 includes a clasp 55 that extends downwardly from the forward end of the latch in FIGS. 1 and 4. When the core is inserted in the shell for use, the clasp 55 engages the shoulders 50, 51 and rides along the surface of the rectangular channel 52, which moves the clasp upwardly. Upward movement of the clasp overcomes the tension in the latch that normally urges the latch away from the core and causes corresponding upward movement of the latch toward the forward portion 26 of the core.

Continued movement of the core into the shell moves the clasp 55 beyond an upstanding keeper 56 fixed in the channel 52 in inwardly spaced relation from the front wall 41 of the shell. When the clasp 55 has moved past the keeper 56, the clasp and the tensioned latch move downwardly in the drawings to their normal position spaced from the forward portion of the core. The latch is then in its operative position to reliably mechanically connect the shell to the core.

The shell may be quickly and easily removed from the core when desired to change ring skirts, or for other reason, by simply using a screw driver or other suitable instrument to lift the clasp 55 above the keeper 56 while grasping the rear of the core and pulling it away from the shell.

The novel latch and skirt of the present invention combine to provide fishermen with a reliable and time efficient fishing lure especially adapted for frequent and quick changes of the ring skirts and outer shell on the lure.

Although specific terms have been employed in describing the invention, they have been used in a generic and descriptive sense only and not for the purpose of limitation, the scope of the invention being defined in the appended claims when read in light of the specification and drawings and the applicable prior art.

I claim:

1. A two-piece fishing lure for use with a leader having a loop at one end attached to a fish hook at the rear of the lure and a loop at the other end for releasable attachment to a fishing line, said two-piece fishing lure comprising a core having a passageway extending therethrough for reception of the leader, at least one ring skirt encircling the core and extending rearwardly therefrom, a shell seated on the core in encircling relation to the core and the ring of the ring skirt, a latch on the core, a clasp on the latch, and a keeper on the shell, whereby the core and the shell may be mechanically connected by engaging the clasp with the keeper.

2. A two-piece fishing lure for use with a leader having a loop at one end attached to a fish hook at the rear of the lure and a loop at the other end for releasable attachment to a fishing line, said two-piece fishing lure comprising a core having a passageway extending therethrough for reception of the leader, a shell seated on the core in encircling relation to the core, a latch on the core, a clasp on the latch, and a keeper on the shell, said latch extending forwardly in spaced parallel relation to the core and being tensioned to move toward and away from the core and wherein the shell has a channel that receives the latch and urges it toward the core ad the shell is mounted on the core, and the clasp on the latch being registrable with the keeper to move the latch away from the core and mechanically lock the shell to the core when the shell is fully seated on the core, whereby the core and the shell may be mechanically connected by engaging the clasp with the keeper.

3. The invention of claim 2 wherein the latch can be moved toward the core and the clasp disengaged from the keeper to unlock the shell for removal from the core by lifting the clasp from the keeper with suitable tool such as a screwdriver.

* * * * *